(12) United States Patent
Hadwen et al.

(10) Patent No.: US 8,419,273 B2
(45) Date of Patent: Apr. 16, 2013

(54) ARRAY ELEMENT FOR TEMPERATURE SENSOR ARRAY CIRCUIT, TEMPERATURE SENSOR ARRAY CIRCUIT UTILIZING SUCH ARRAY ELEMENT, AND AM-EWOD DEVICE INCLUDING SUCH A TEMPERATURE SENSOR ARRAY CIRCUIT

(75) Inventors: Benjamin James Hadwen, Oxford (GB); Jason Roderick Hector, Oxford (GB); Adrian Marc Simon Jacobs, Reading (GB); Michael Paul Coulson, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 372 days.

(21) Appl. No.: 12/772,245

(22) Filed: May 3, 2010

(65) Prior Publication Data

US 2011/0268151 A1 Nov. 3, 2011

(51) Int. Cl.
*G01K 7/00* (2006.01)
*G01K 3/00* (2006.01)

(52) U.S. Cl.
USPC ............................ 374/178; 374/112; 374/166

(58) Field of Classification Search .................. 374/178, 374/112, 166
See application file for complete search history.

(56) References Cited

U.S. PATENT DOCUMENTS

| 3,430,077 | A | 2/1969 | Bargen |
| 3,791,217 | A | 2/1974 | Stout et al. |
| 3,812,717 | A | 5/1974 | Miller et al. |
| 5,829,879 | A | 11/1998 | Sanchez et al. |
| 5,918,982 | A * | 7/1999 | Nagata et al. ................ 374/178 |
| 6,565,727 | B1 | 5/2003 | Shenderov |
| 6,633,656 | B1 | 10/2003 | Picard |
| 6,911,132 | B2 | 6/2005 | Pamula et al. |
| 7,163,612 | B2 | 1/2007 | Sterling et al. |
| 7,216,660 | B2 * | 5/2007 | Troian et al. .................... 137/13 |
| 7,255,780 | B2 | 8/2007 | Shenderov |
| 7,329,545 | B2 | 2/2008 | Pamula et al. |
| 2004/0208227 | A1* | 10/2004 | Hauenstein ................ 374/178 |
| 2005/0219172 | A1* | 10/2005 | Shih et al. ........................ 345/82 |
| 2008/0085559 | A1 | 4/2008 | Hartzell et al. |
| 2008/0280350 | A1 | 11/2008 | Moriwaki et al. |
| 2010/0167959 | A1* | 7/2010 | Johnson et al. .................. 506/39 |

FOREIGN PATENT DOCUMENTS

| DE | 103 51 843 A1 | 6/2005 |
| JP | 2004-117260 A | 4/2004 |
| JP | 2006-073887 A | 3/2006 |
| WO | 2006/033582 A1 | 3/2006 |
| WO | 2009/019658 A2 | 2/2009 |

OTHER PUBLICATIONS

Patrick Tabeling, "Introduction to Microfluidics", Oxford University Press (Jan. 2006), ISBN 0-19-856864-9, pp. 211-214.
Berthier and Silberzan, "Microfluidics for Biotechnology", Artech House (2006), ISBN-10:1-58053-961-0, pp. 17-72.

(Continued)

*Primary Examiner* — Mirellys Jagan
(74) *Attorney, Agent, or Firm* — Renner, Otto, Boisselle & Sklar LLP

(57) ABSTRACT

An array element for a temperature sensor array circuit. The array element includes a switch transistor; and a temperature sensor element having an impedance which varies as a function of temperature, the temperature sensor element being connected in parallel with a source and drain of the switch transistor.

11 Claims, 14 Drawing Sheets

OTHER PUBLICATIONS

McPherson and Moller, "The basics: PCR", Taylor and Francis (2$^{nd}$ Edition 2006), ISBN 0-4153-5547-8, Chapter 1.

Thomas D.McGee, "Principles and Methods of Temperature Measurement", Wiley Interscience (1988), p. 230-232.

Brodersen et al., "MOS Switched Capacitor Filters", Proceedings of the IEEE, vol. 67, No. 1 (Jan. 1979), pp. 61-75.

European Search Report for corresponding European Application No. 11163816.9 dated Dec. 5, 2012.

* cited by examiner

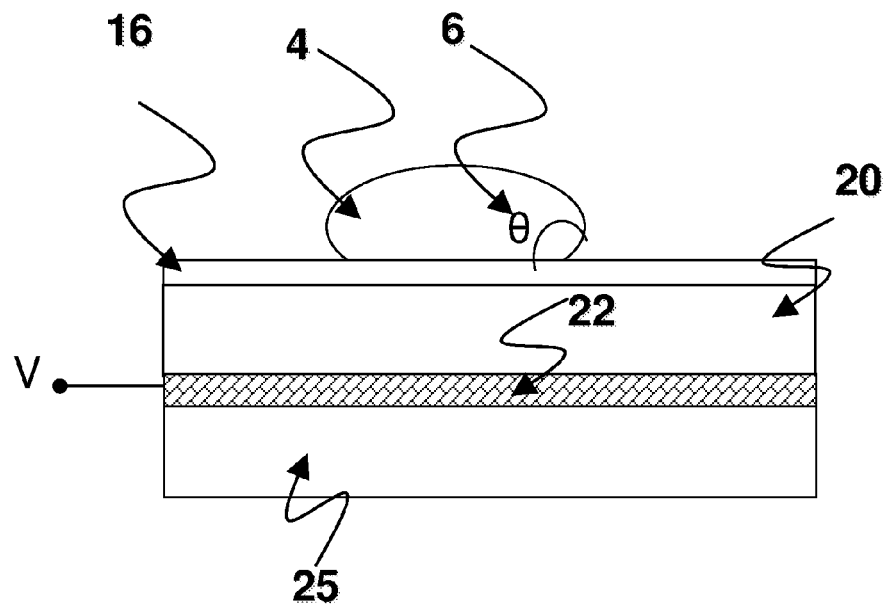
Figure 1: Prior Art
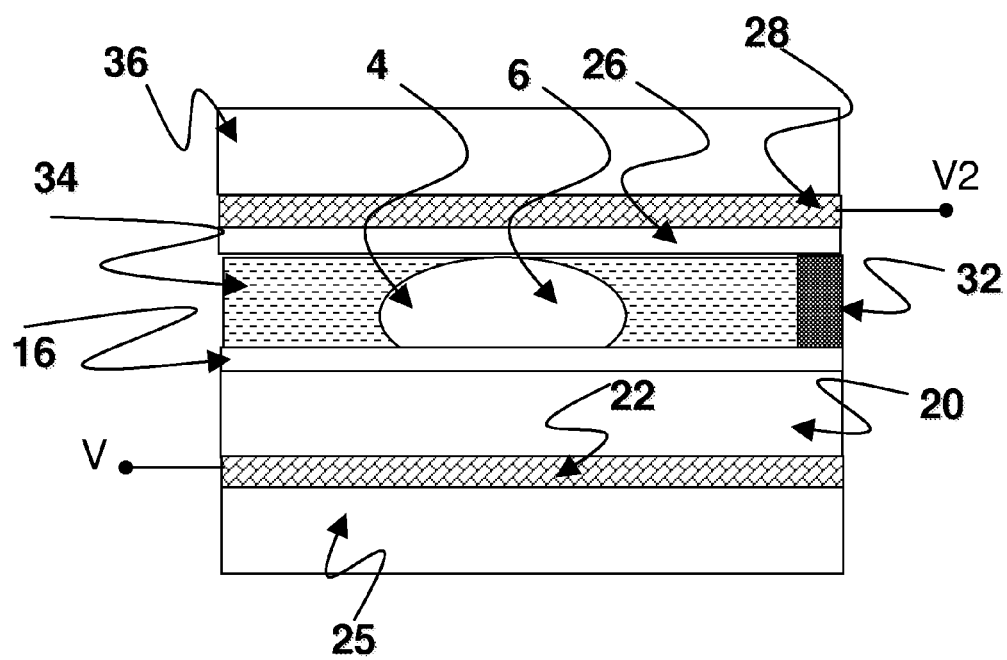
Figure 2: Prior Art

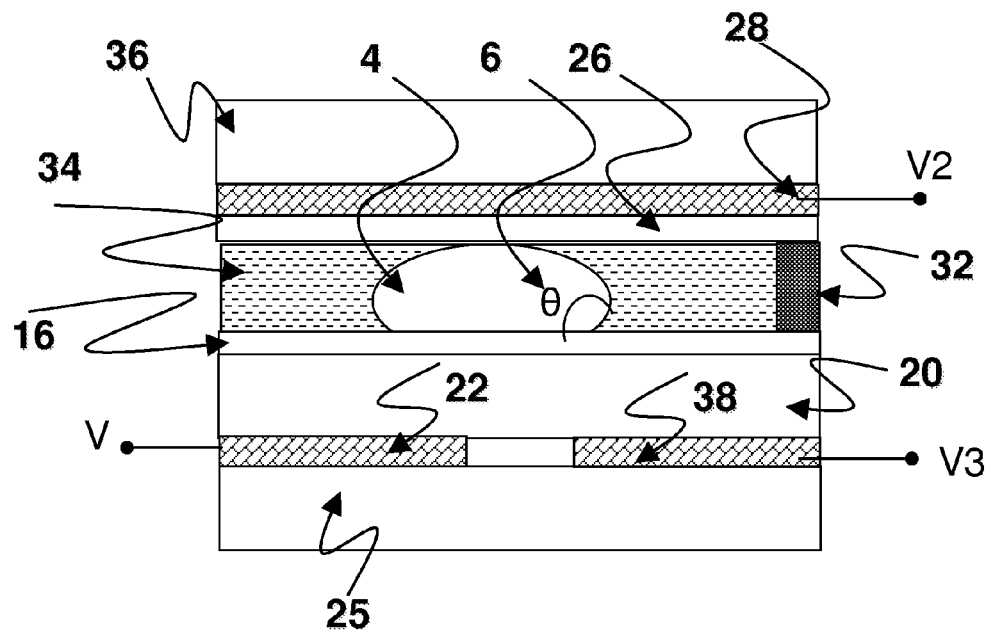
Figure 3: Prior Art
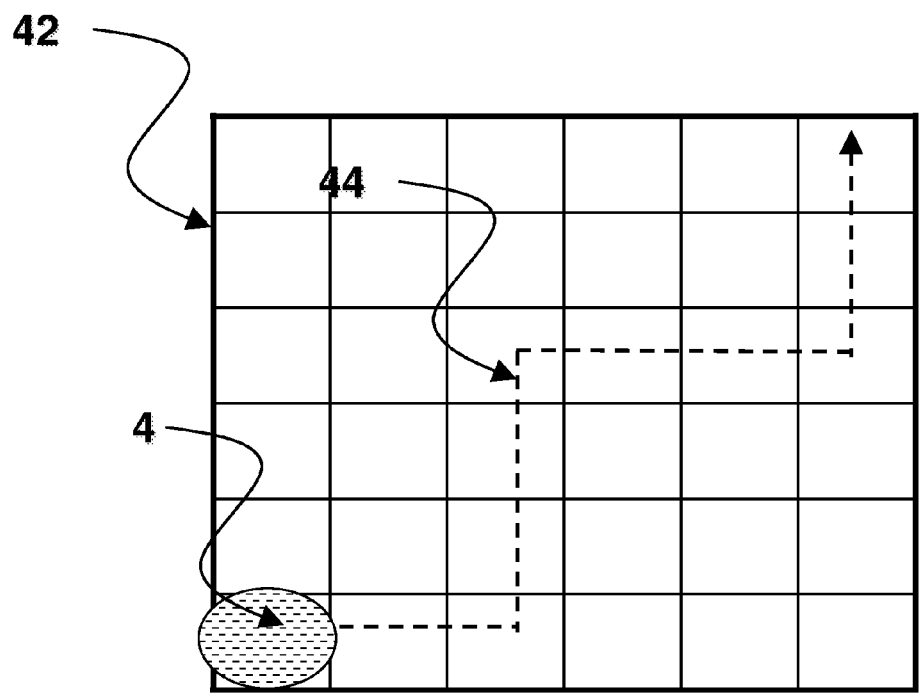
Figure 4: Prior Art

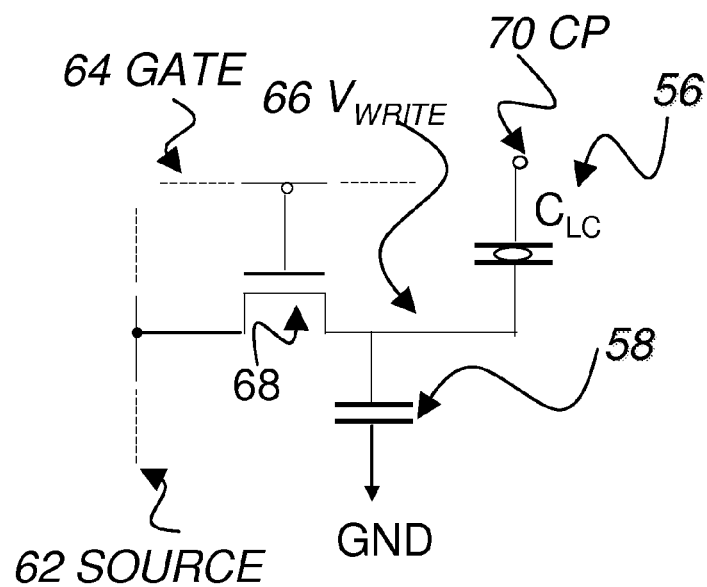
Figure 5: Prior Art
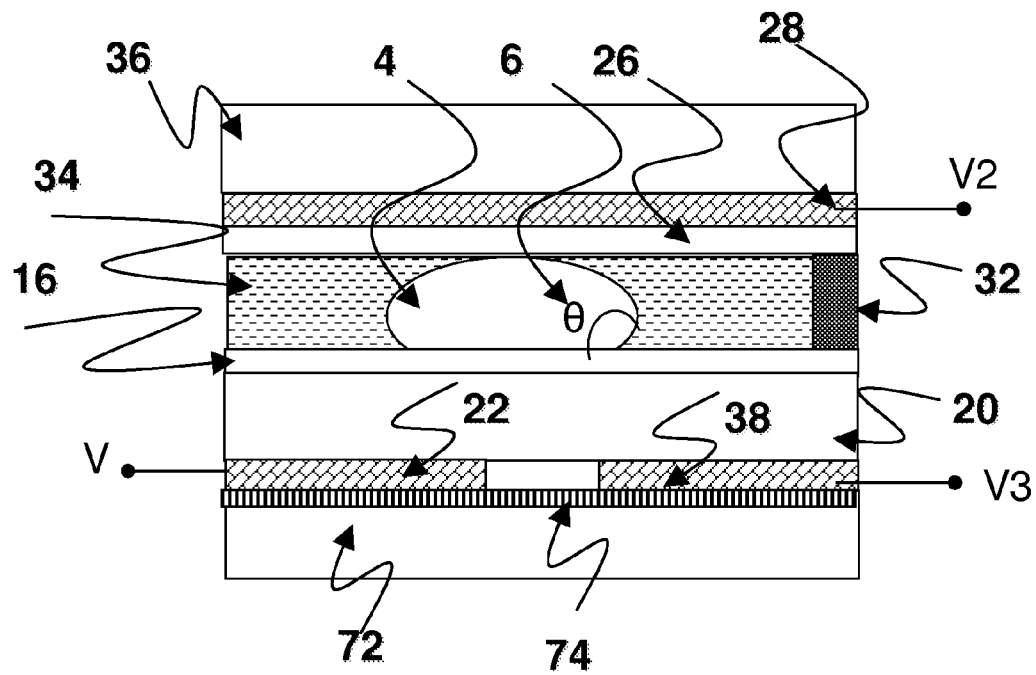
Figure 6: Prior Art

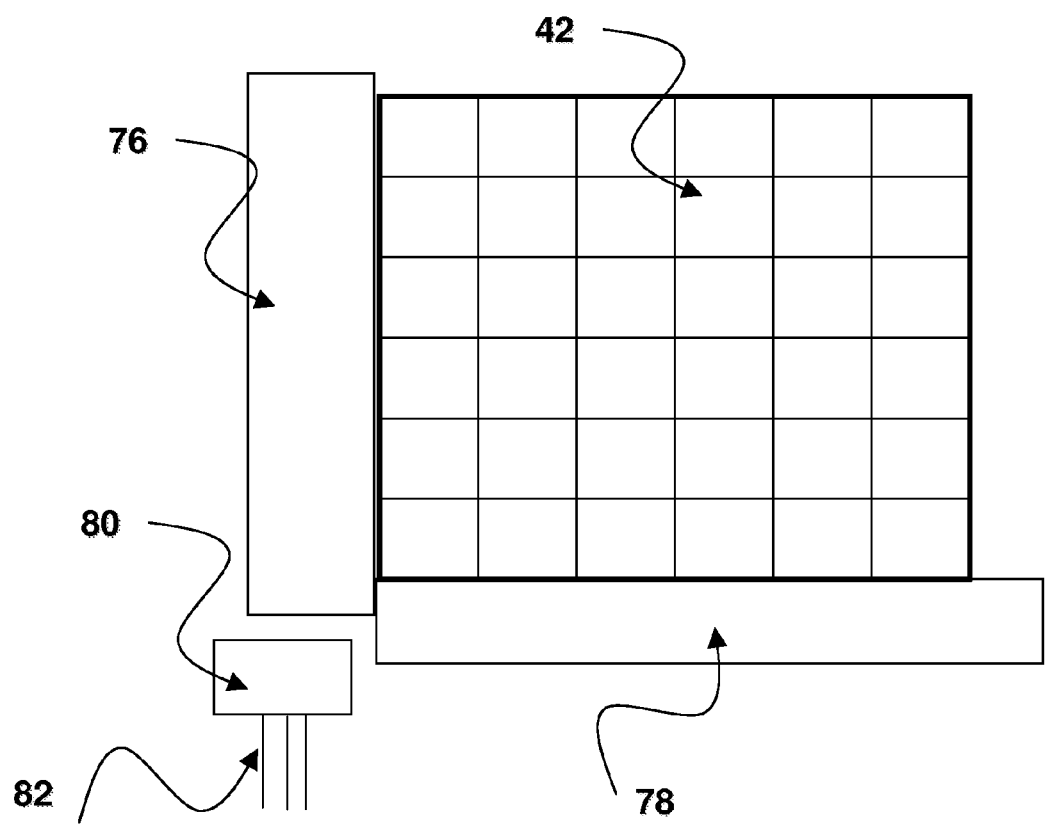
Figure 7: Prior Art

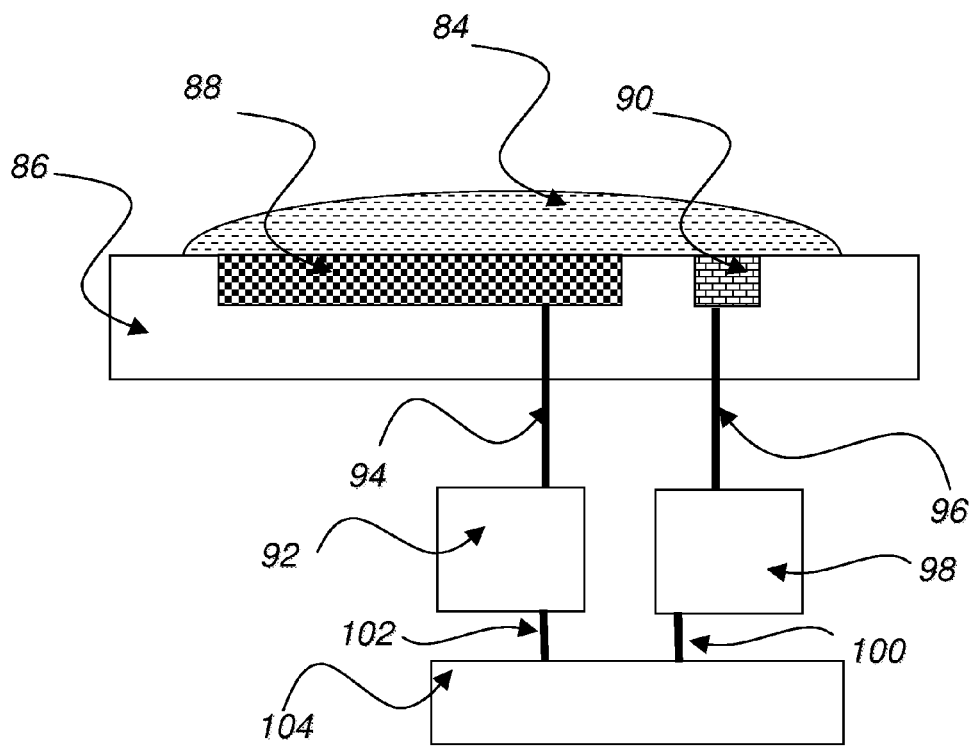
Figure 8: Prior Art
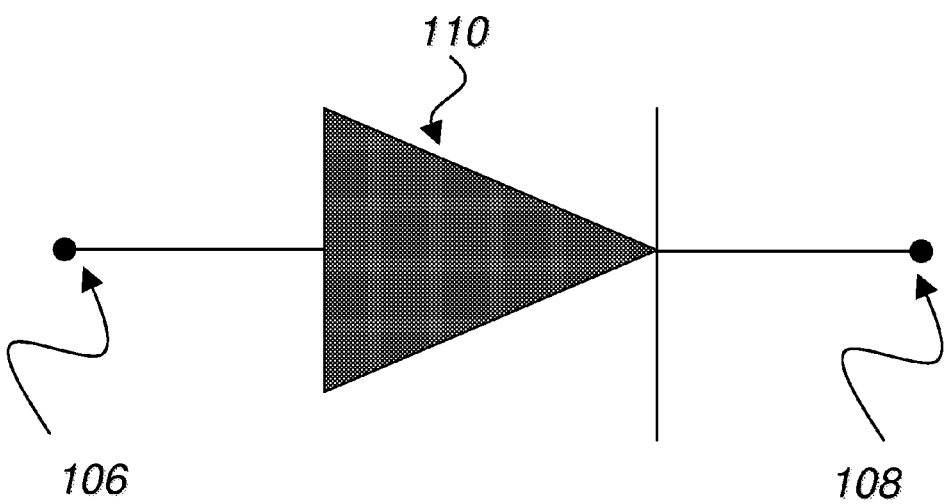
Figure 9: Prior Art

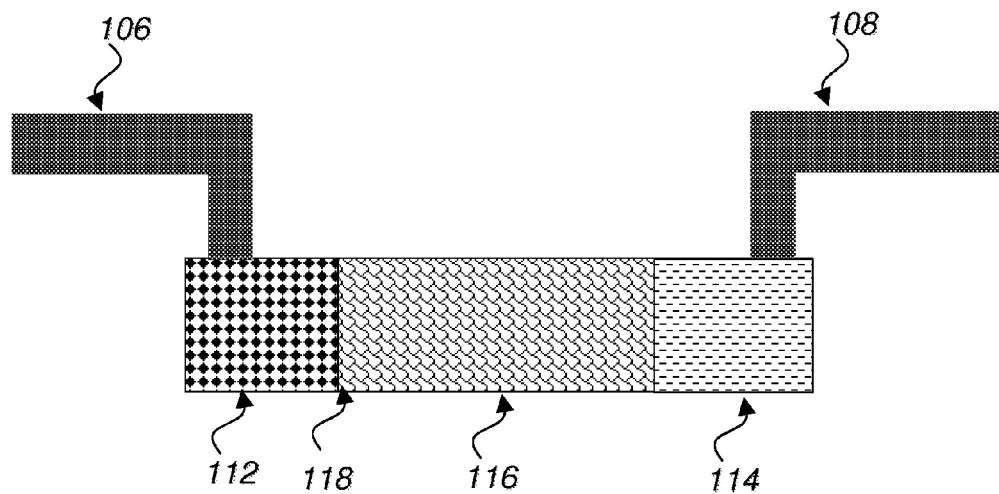
Figure 10: Prior Art
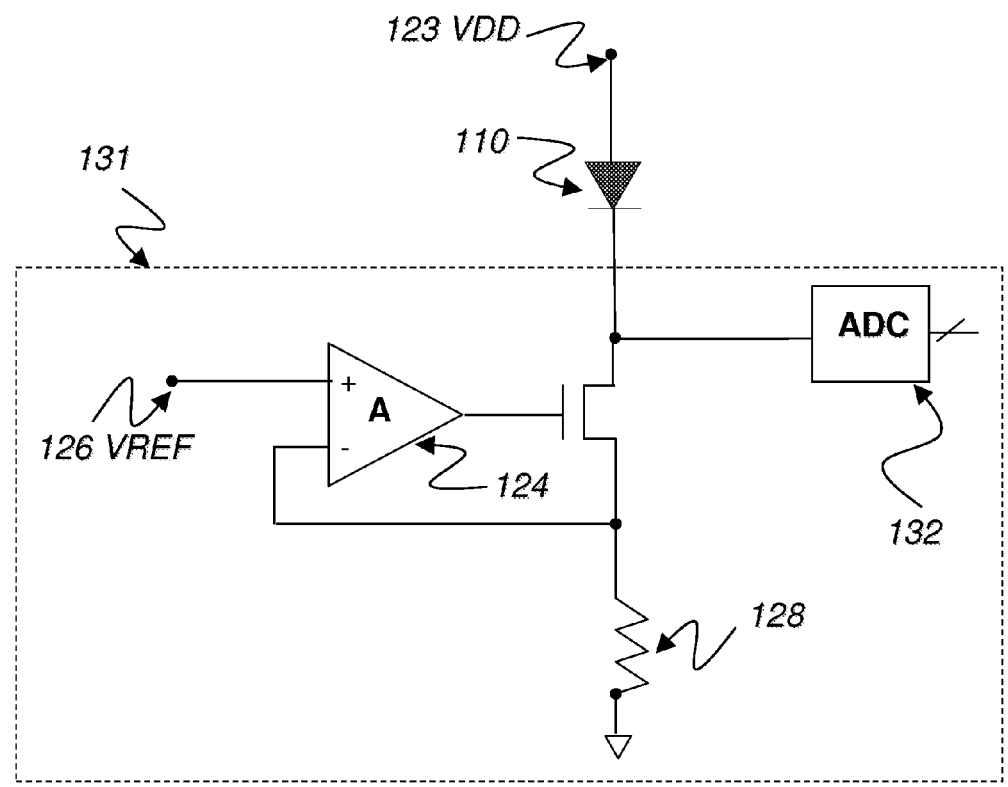
Figure 11: Prior Art

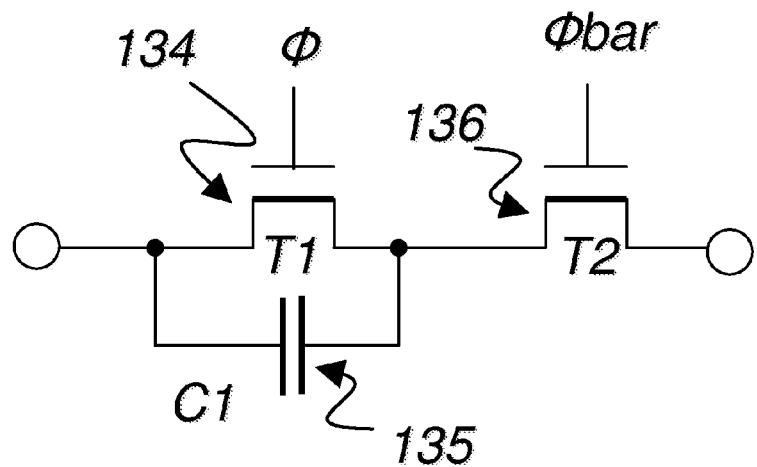
Figure 12: Prior Art
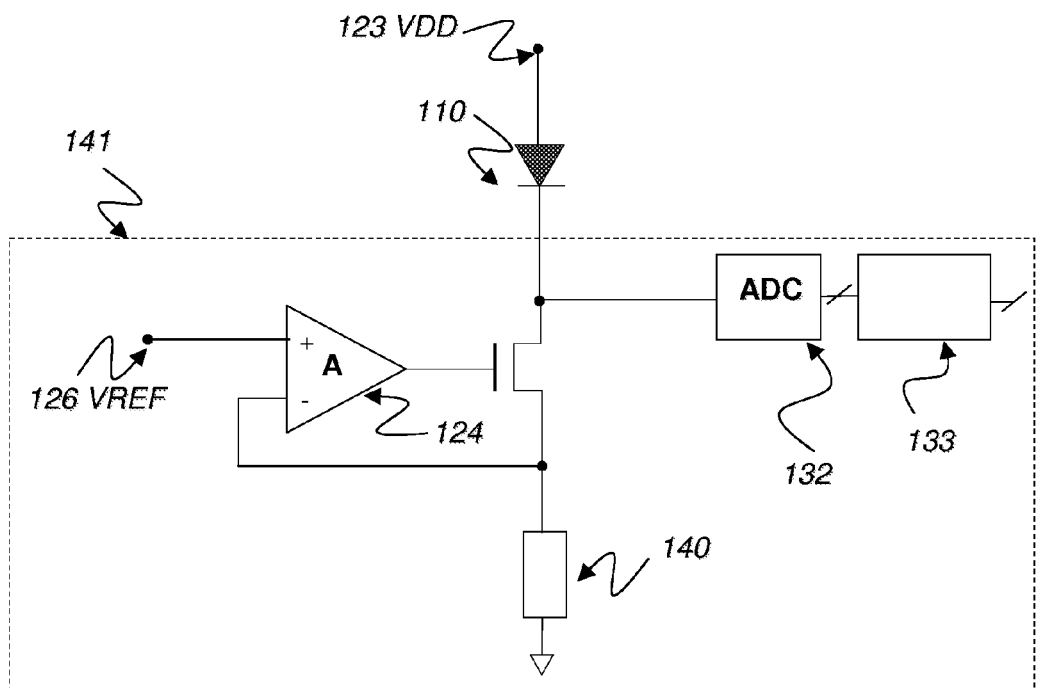
Figure 13: Prior Art

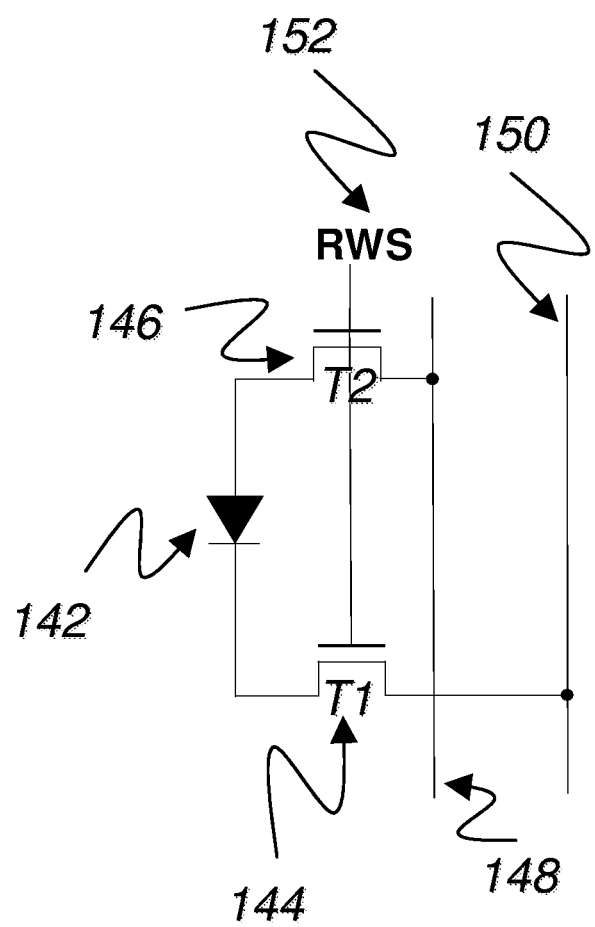
Figure 14: Prior Art

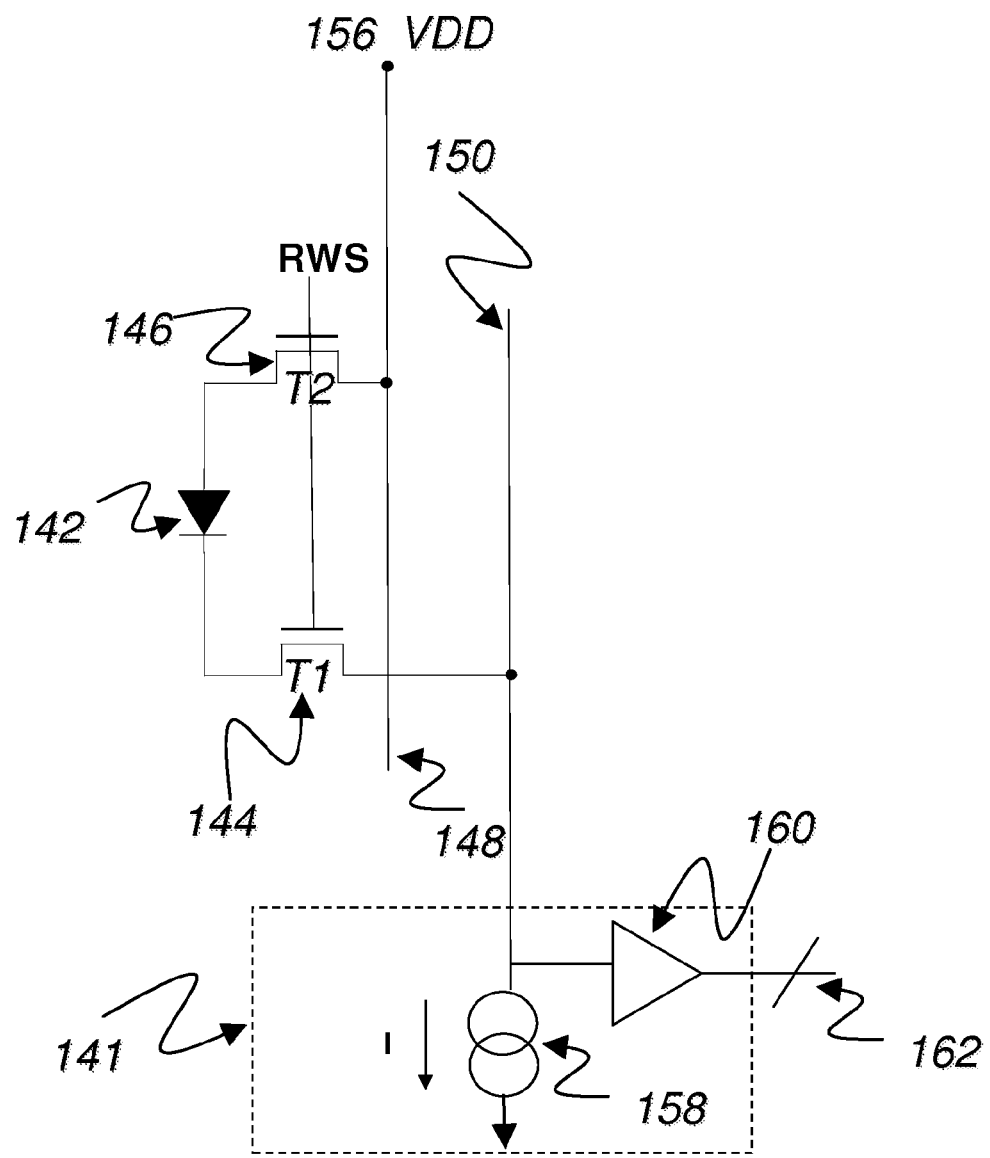
Figure 15: Prior Art

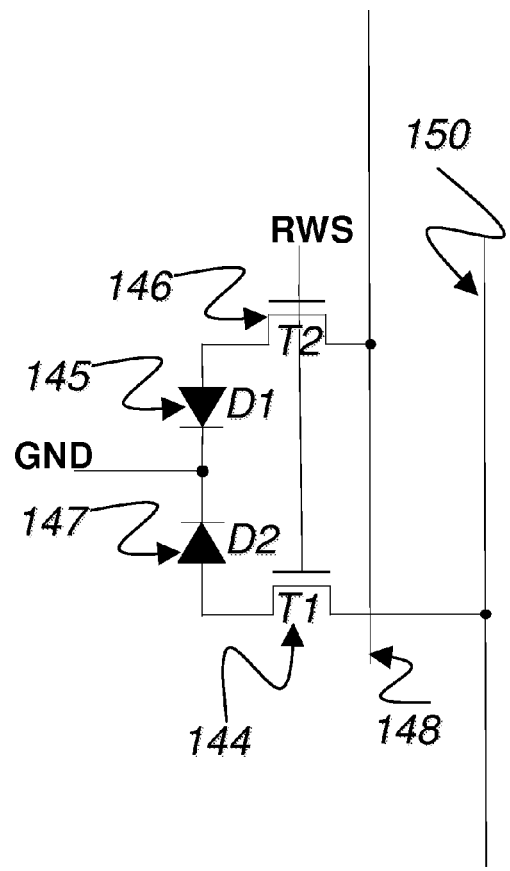
Figure 16: Prior Art
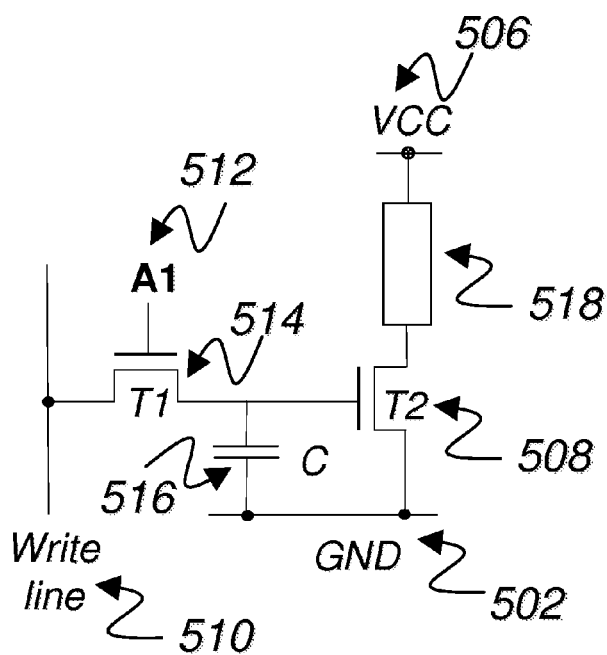
Figure 17: Prior Art

ARRAY ELEMENT FOR TEMPERATURE SENSOR ARRAY CIRCUIT, TEMPERATURE SENSOR ARRAY CIRCUIT UTILIZING SUCH ARRAY ELEMENT, AND AM-EWOD DEVICE INCLUDING SUCH A TEMPERATURE SENSOR ARRAY CIRCUIT

TECHNICAL FIELD

This invention finds application to the field of digital microfluidics and more specifically to active matrix electrowetting-on-dielectric (AM-EWOD). Electrowetting-On-Dielectric (EWOD) is a known technique for manipulating droplets of fluid on an array. AM-EWOD refers to implementation of EWOD in an active matrix array, for example by using thin film transistors (TFTs).

BACKGROUND ART

Recent decades have seen a surge of interest in miniaturised electro-mechanical systems, so-called MEMs technology. One promising area of MEMs is that of microfluidics; the control, manipulation and sensing of micro-liter volumes of liquids. Applications in this area are numerous and include chemical synthesis and the chemical and biological analysis of small quantities of substances, so called Lab-on-a-chip (LoaC). A general introduction to the field can be found in many standard textbooks, e.g. "Introduction to Microfluidics", Patrick Tabeling, Oxford University Press (Jan. 2006), ISBN 0-19-856864-9.

Digital microfluidics is concerned with the control, manipulation and sensing of droplets of fluids on an individual basis. An introduction to this area can be found in chapter 2 of "Microfluidics for Biotechnology", Berthier and Silberzan, Artech House (2006), ISBN-10:1-58053-961-0.

This reference also describes the method of electrowetting on dielectric (EWOD) for the control and manipulation of droplets in an array-based architecture. A simple architecture for performing EWOD is shown in FIG. 1. A substrate 25 has disposed upon it a conductive electrode 22, with an insulator layer 20 deposited on top of that. The insulator layer 20 separates the conductive electrode 22 from the hydrophobic layer 16 upon which an ionic droplet 4 sits. The droplet 4 makes a contact angle θ with the surface of the hydrophobic layer 16, the value of which depends on the hydrophobicity of the surface. By applying a voltage V to the conductive electrode 22, the contact angle 6 (θ) can be adjusted. An advantage of manipulating contact angle by means of EWOD is that power consumption is low since there is no path for DC current to flow.

FIG. 2 shows an alternative and improved arrangement whereby a top substrate 36 is also supplied, containing an electrode 28 coated with a hydrophobic layer 26. A voltage V2 may be applied to the top electrode such that the electric field at the interfaces of the droplet 4 and hydrophobic layers 16,26 is a function of the difference in potential between V2 and V. A spacer 32 may be used to fix the height of the channel volume within which the droplet 4 is constrained. In some implementations the channel volume around the droplet 4 may be filled by a non-ionic liquid, e.g. oil 34. The arrangement of FIG. 2 is advantageous compared to that of FIG. 1 for two reasons: firstly it is possible to generate larger and better controlled electric fields at the surfaces where the droplet 4 contacts the hydrophobic layers 16,26. Secondly the droplet 4 is sealed within the device preventing losses due to evaporation etc.

U.S. Pat. No. 6,565,727 (A. Shenderov; issued May 20, 2003) discloses a passive matrix EWOD device for moving droplets through an array. The device is constructed as shown in FIG. 3. The conductive layer of the lower substrate 25 is patterned so that a plurality of electrodes 22, 38 are realised. These may be termed the EW drive elements. By applying different voltages, termed the EW drive voltages, (e.g. V and V3) to different electrodes (e.g. electrode 22 and electrode 38), the hydrophobicity of the surface of the hydrophobic layers 16,26 can be controlled, thus enabling a droplet 4 to move in the lateral direction. U.S. Pat. No. 6,911,132 (V. Pamula et al.; issued Jun. 28, 2005) discloses an arrangement, shown FIG. 4, whereby the conductive layer on the lower substrate is patterned to form a two dimensional array 42. By the application of time dependent voltage pulses to some or all of the different electrodes it is thus possible to move a droplet 4 though the array on a path 44 that is determined by the sequence of the voltage pulses. U.S. Pat. No. 6,565,727 further discloses methods for other droplet operations including the splitting and merging of droplets and this mixing together of droplets of different materials. In general the voltages required to perform typical droplet operations are relatively high. Values in the range 20-60V are quoted in prior art (e.g. U.S. Pat. No. 7,329,545 (V. Pamula et al., issued Feb. 12, 2008)) depending on the technology used to create the insulator and hydrophobic layers.

U.S. Pat. No. 7,255,780 (A. Shenderov; issued Aug. 14, 2007) similarly discloses a passive matrix EWOD device used for carrying out a chemical or biochemical reaction by combining droplets of different chemical constituents.

Thin film electronics based on thin film transistors (TFTs) is a very well known technology which can be used, for example, in controlling Liquid Crystal (LC) displays. TFTs can be used to switch and hold a voltage onto a node using the standard display pixel circuit shown in FIG. 5. The pixel circuit consists of a switch TFT 68, and a storage capacitor 58. By application of voltage pulses to the source line 62 and gate line 64, a voltage $V_{write}$ 66 can be programmed and stored in the pixel. By applying a different voltage to the counter-substrate CP 70, a voltage is thus maintained across the liquid crystal 56 (represented by capacitance $C_{LC}$) in the pixel location.

Many modern displays use an Active Matrix (AM) arrangement whereby a switch transistor is provided in each pixel of the display. Such displays often also incorporate integrated driver circuits to supply voltage pulses to the row and column lines (and thus program voltages to the pixels in an array). These are realised in thin film electronics and integrated onto the TFT substrate. Circuit designs for integrated display driver circuits are very well known. Further details on TFTs, display driver circuits and LC displays can be found in standard textbook, for example "Introduction to Flat Panel Displays", (Wiley Series in Display Technology, WileyBlackwell (January 2009), ISBN 0470516933).

U.S. Pat. No. 7,163,612 (J. Sterling et al.; issued Jan. 16, 2007) describes how TFT based electronics may be used to control the addressing of voltage pulses to an EWOD array by using circuit arrangements very similar to those employed in AM display technologies. FIG. 6 shows the approach taken. In contrast with the EWOD device shown in FIG. 3, the bottom substrate 25 is replaced by a substrate 72 with thin film electronics 74 disposed upon it. The thin film electronics 74 are used to selectively program voltages to the patterned conductive layer electrodes 22,38 used for controlling electrowetting. It is apparent that the thin film electronics 74 can be realised by a number of well known processing technologies, for example silicon-on-insulator (SOD, amorphous silicon on glass or low temperature polycrystalline silicon (LTPS) on glass.

Such an approach may be termed "Active Matrix Electrowetting on Dielectric" (AM-EWOD). There are several advantages in using TFT based electronics to control an EWOD array, namely:

Driver circuits can be integrated onto the AM-EWOD array substrate. An example arrangement is shown in FIG. 7. Control of the EWOD array 42 is implemented by means on integrated row driver 76 and column driver 78 circuits. A serial interface 80 may also be provided to process a serial input data stream and write the required voltages to the array 42. The number of connecting wires 82 between the array substrate and external drive electronics, power supplies etc. can be made relatively few, even for large array sizes.

TFT-based electronics are well suited to the AM-EWOD application. They are cheap to produce so that relatively large substrate areas can be produced at relatively low cost.

It is possible to incorporate TFT-based sensing into Active Matrix controlled arrays. For example US20080085559 describes a TFT based active matrix bio-sensor utilising cantilever based arrays.

TFTs fabricated in standard processes can be designed to operate at much higher voltages than transistors fabricated in standard CMOS processes. This is significant since many EWOD technologies require EWOD actuation voltages in excess of 20V to be applied.

In a number of EWOD applications it may be important to sense and/or control the temperature of droplets in an array. Examples of such instances may include:

Chemical or biochemical synthesis, where temperature control may be required to initiate and/or control chemical or biochemical reactions.

Detection of an endothermic or exothermic chemical reaction between droplets (i.e. the reaction absorbs or releases heat, and thus its detection indicates the occurrence of the reaction).

An example of particular importance is the technique of polymerase chain reaction (PCR) for the amplification of DNA. PCR is a very well known technique, the details of which are well described in prior art, for example in chapter 1 of "The basics: PCR", McPherson and Moller, Taylor and Francis ($2^{nd}$ Edition, 2006), ISBN 0-4153-5547-8. To implement PCR the DNA sample to be amplified must be mixed with various chemical reagents and then arranged to undergo a series of successive heating and cooling cycles. The total number of thermal cycles is typically 20-30. To perform PCR accurately and efficiently it is generally necessary to control the temperature of the chemical reagents reasonably accurately (typically to within a few degrees Celsius). In order to do this it is generally advantageous to implement some means of feedback control, an example of which is shown in FIG. 8. The chemical reagents 84 whose temperature is to be modified/controlled are arranged to be in thermal contact with a surface 86. A heater element 88 and temperature sensor element 90 are disposed upon this surface 86, in good thermal contact with the chemical reagents 84. The heater element 88 is electrically connected via 94 to a heater driver circuit 92 which is in turn connected via 102 to a processing unit 104, e.g. a CPU. The temperature sensor element 90 is connected via 96 to a temperature measurement circuit 98, which is in turn connected via 100 to the processing unit 104.

The whole arrangement operates such that the current supplied to the heater element 88 is determined in response to the temperature measured by the sensor element 90. The temperature can thus be more accurately controlled than in an arrangement only comprising a heater capability. A number of means for design of suitable feedback control circuits are known. For example WO2009/019658 (D. Fish et al., published Feb. 12, 2009) describes proportional integral (PI) and proportional integral differential (PID) schemes to optimise the thermal stability of the chemical reagent whose temperature is being controlled.

There exist a large number of well known techniques for sensing ambient temperature. Many of these methods can be found described in "Principles and methods of Temperature Measurement", Thomas D. McGee, Wiley Interscience (1988). Page 230 of this publication describes a particularly convenient technique for measuring temperature using a forward biased PN junction (which can either be a diode or a diode connected transistor). The circuit symbol for the device is shown in FIG. 9. The device has two terminals, an anode 106 and a cathode 108. Forward bias operation corresponds to a positive potential V being applied to the anode 106 with respect to the cathode 108.

In forward bias operation the diode current I is given approximately by:

$$I = SW \, \exp\left(\frac{qV}{mkT}\right) \quad \text{(equation 1)}$$

Where q is the electronic charge, k is Boltzmann's constant, T is the absolute temperature (in Kelvin), m is the diode ideality factor, a process dependent factor expressing the relative contributions of diffusion and recombination current, W is the diode width and S is a process dependent constant (which may also incorporate a temperature dependence). The relationship of equation (1) ceases to be valid when I exceeds a certain maximum limit (determined by the geometry of the device and processing details) because the current becomes limited by the diode's own self resistance.

It is easily shown that when such a device is forward biased (the anode voltage is positive with respect to the cathode voltage) with a constant current sink the voltage drop across the diode is proportional to the absolute temperature in Kelvin, specifically:

$$V = \frac{mkT}{q} \ln\left(\frac{I}{SW}\right) \quad \text{(equation 2)}$$

FIG. 10 shows a possible construction of a diode realised in a thin film process. The device is formed from a layer of semiconductor material consisting of a p+ doped region 112, an n-doped region 116 and an n+ doped region 114. Electrical connections, e.g. with metal are made to the p+ doped region 112 and n+ doped region 116 to form the anode 106 and cathode 108 terminals of the device. The diode p-n junction 118 is thus formed at the interface between the p+ doped region 112 and the n-doped region 116.

In operation in forward bias mode the device characteristics approximate to those described by equation 2, although typically the term S has a temperature dependence such that the total bias drop across the device at constant current is given approximately by:

$$V = a - bT \quad \text{(equation 3)}$$

Where a and b depend on the current sunk and process dependent constants.

One possible circuit implementation for sinking a constant forward current through a diode is shown in FIG. 11.

A DC reference voltage Vref 126 is applied to the non-inverting terminal of the operational amplifier 124. The operational amplifier 124 works so as to maintain the same potential at the inverting terminal. Therefore the potential Vref is generated across the terminals of the resistor element 128 whose resistance is R. By consequence of Ohm's law, the current through this resistor element 128 is equal to I=Vref/R. Since (ideally) the input current of the operational amplifier is equal to zero, the current through the diode 110 is also equal to I. The anode of the diode 110 is coupled to the source or power supply voltage VDD 123. The circuit therefore sinks a constant current through the diode 110 and the voltage at the cathode is equal to VDD−V, where V is given by equation (2) above.

This voltage can then be converted into a digital signal by a suitable analogue-to-digital converter (ADC) 132. This ADC 132 may be of a standard type, for example consisting of a comparator followed by a counter. The DC voltage level at the ADC input is converted to a digitised output signal which represents the measured value of the temperature. The portion of the circuit termed the column output circuit 131, whose input is connected to the cathode of the diode 110, thus performs the function of sinking a constant current and measuring the potential at its input.

It will be apparent to one skilled in the art that there are many possible alternative implementations of a column output circuit 131 which may be devised to perform this function.

In practical implementations of the circuit of FIG. 11, depending on the value of the current being sunk through the diode 110, the required resistance value of the resistor element 128 may be quite large. In some instances this may be inconvenient to implement, for example due to both the physical layout size of the resistor. An additional disadvantage is that the resistivity of the material used to form the resistor element 128 may have undesirable temperature dependence. A well known technique for avoiding both of these problems is the use of a switched capacitor circuit to imitate a resistor element. FIG. 12 shows a simple implementation of such a switched capacitor resistor element. This arrangement is made to imitate a resistor element by applying a square wave pulse Φ to the gate of one of the transistors 134 and an anti-phase pulse Φbar to the gate of the other transistor 136. The technique is described in detail in "MOS Switched Capacitor Filters", Brodersen et al, Proceedings of the IEEE, Vol. 67, num. 1 (Jan. 1979). The value of the effective resistance is determined from the frequency at which Φ and Φbar are switched and the value of the capacitor 135. One advantage of the switched capacitor implementation of a resistor element is that the layout area required to implement it may be less than that of a conventional resistor element. A further advantage is that the switched capacitor resistor element can be made relatively temperature independent. A further advantage is that it is possible to change the value of the resistance by changing the frequency of the pulses Φ and Φbar. Since the resistance can be changed by adjusting the frequency of the square wave pulses Φ and Φbar, it can be appreciated that the device can function as a variable resistor if some simple means of adjusting Φ and Φbar is available, e.g. a simple digital timing circuit.

A further disadvantage of the circuit of FIG. 11 is that the change in output voltage at the cathode of the diode 110 for a given change in the temperature may be quite small, for example only a few millivolts per degree Kelvin. This disadvantage is likely to be especially appreciable for the case where the temperature sensor is fabricated with thin film circuit components. The relatively poor quality and variability of the TFT components may make the design of an ADC capable of sensing an analogue voltage level to a few millivolts precision very difficult, and so the circuit of FIG. 11 may not be very sensitive. U.S. Pat. No. 3,791,217 (B. Stout et al.; issued Feb. 12, 1974) and JP2006073887 (T. Kuwabara et al.; published Mar. 16, 2006) describe a modified version of this implementation where the single diode element is replaced with n multiple diode elements connected in series. In this case the voltage drop across the series thin film diodes is given by the expression:

$$V = n(a - bT) \quad \text{(equation 4)}$$

where n is the number of series connected diode elements. The change in output voltage for a given change in temperature has thus been increased by a factor n. The choice of value for n for a practical design of temperature sensor will depend on the detailed construction of the diode design and processing, the circuit implementation and operating voltages and the range over which the sensor must operate. For example, considering the circuit of FIG. 11, n should be made as large as possible whilst being careful to ensure that firstly the current sunk through the diodes is not so large that the self resistance of the diodes becomes important so that equation (5) ceases to be valid, and secondly that the voltage drop across the diodes as predicted by (5) does not exceed VDD−Vref, otherwise saturation at of the output of the sensor will occur.

A further disadvantage of the implementations of the implementation of FIG. 11 is that the output voltage is dependent on the process parameter S which may vary significantly from sample to sample. As a result accurate temperature measurement may require some form of initial calibration which may be costly from a manufacturing point of view. U.S. Pat. No. 3,430,077 (D. Bargen; issued Feb. 25, 1969) and U.S. Pat. No. 3,812,717 (G. Miller et al.; issued May 28, 1974) describe methods for overcoming this disadvantage by arranging for two measurements of the voltage drop across the diode to be made with different currents being sunk for each, $I_1$ and $I_2$ respectively. Assuming the diodes have the characteristic given by equation (1), for the first measurement the output voltage is given by $$V_1 = \frac{nmkT}{q} \ln\left(\frac{I_1}{SW}\right) \quad \text{(equation 5)}$$

In the second case the output voltage is given by $$V_2 = \frac{nmkT}{q} \ln\left(\frac{I_2}{SW}\right) \quad \text{(equation 6)}$$

Following measurement of the two voltage levels $V_1$ and $V_2$ these are then subtracted to give a result $$V_s = V_1 - V_2 = \frac{nmkT}{q} \ln\left(\frac{I_1}{I_2}\right) \quad \text{(equation 7)}$$

The voltage difference $V_s$, depends on the ratio of the two currents and the process dependent parameter S has been eliminated.

It will be apparent to one skilled in the art that there are a number of possible methods for implementing this technique. For example the column output circuit can be modified to the arrangement 141 shown in FIG. 13. A digital subtraction circuit 133 has been added to the output of the circuit of FIG. 11, and the resistor element 128 replaced by a variable resistor element 140 implemented by means of the switched capacitor arrangement previously described. In this implementation two separate measurements of the voltage drop across the temperature sensor element (diode 110) can be made with a different value of current sunk through the temperature sensor element in each case. The current may be varied either by:

Changing the value of Vref 126. Accordingly the current sunk will be Vref1/R and Vref2/R respectively for the two values of Vref where R is the resistance of the resistor element 140

Changing the frequency of the pulses applied to the switched capacitor arrangement employed as the resistor element 140. Accordingly, the effective resistance can be made different for each of the two measurements, for example values $R_1$ and $R_2$. Thus currents equal to Vref/$R_1$ and Vref/$R_2$ would be sunk through the diode 110 for the first and second measurements respectively.

In accordance with equation 7, the two voltage measurements obtained can be subtracted to give a result where the process dependent parameter S has been eliminated. This could be achieved by a number of standard techniques, for example the two voltages could be subtracted in the analogue domain by means of intermediate storage on reference capacitors, or they could be subtracted following conversion to digital signals by means of a simple digital subtraction circuit 133.

A similar technique for eliminating the measurement dependence on the parameter S is described in U.S. Pat. No. 5,829,879 (H. Sanchez et al.; issued Nov. 3, 1998). This is achieved by performing two measurements of the output voltage with different widths of diodes switched into the circuit.

For the first case the total diode width is $W_1$ and the voltage drop across the diodes is given by:

$$V_1 = \frac{nmkT}{q}\ln\left(\frac{I}{SW_1}\right) \quad \text{(equation 8)}$$

In the second case the total diode width is $W_2$ and the voltage drop is:

$$V_2 = \frac{nmkT}{q}\ln\left(\frac{I}{SW_2}\right) \quad \text{(equation 9)}$$

The difference between these voltages is then:

$$V_s = V_1 - V_2 = \frac{nmkT}{q}\ln\left(\frac{W_2}{W_1}\right) \quad \text{(equation 10)}$$

The dependence on the parameter S has again been eliminated and the voltage $V_s$ depends on the ration of $W_1$ and $W_2$.

For many applications it is useful to be able to sense temperature separately at a number of spatial locations, i.e. in an array-based format. Whilst it may be possible to perform such a function by implementing multiple copies of a temperature sensor element and measurement circuit using methods already described, this is generally impractical if the array size is required to be large since a very large number of connections needs to be made to the substrate, or if the array element size is required to be physically small.

WO2009019658 describes an array-based temperature sensor integrated in a thin film process. The sensor element described could be a (temperature dependent) resistor element, a forward biased diode or a diode connected transistor. The array element circuit described is shown in FIG. 14. This consists of a temperature sensor element (diode) 142, a switch transistor 144, and a second switch transistor 146. The gate of each of the switch transistors is connected to a row select line RWS at 152, common to each array element within the same row. The temperature sensor element 142 is connected between the switch transistors as shown. Two column electrodes 148,150 are connected to each element 148 and 140. These connections are common to each element in the same column of the array.

External circuitry is provided to operate the array as shown in FIG. 15. The first column electrode 148 is connected to a power supply voltage VDD 156. The second column electrode 150 is connected to a column output circuit 141 for sinking a constant current and measuring the voltage developed. The column output circuit 141 may be comprised of a current source 158 and an output amplifier 160 using standard circuit techniques, for example as has already been described. The arrangement of the output circuit 141 is duplicated for each column of the array. In operation a voltage high level is applied to the RWS line for the row element being read out. The switch transistors 144 and 146 are thus both turned on. An electrical connection is therefore made between the power supply voltage VDD 156 and the anode of the temperature sensor element 142, and between the cathode of the temperature sensor element 142 and the column output circuit 141. The arrangement then operates in the same way as the single element temperature sensor already described. It will be apparent to one skilled in the art that the calibration techniques described for the single element temperature sensor can also be readily extrapolated to an array-based architecture, whereby each element in the array may be calibrated individually using one or more of the techniques already described.

It may be noted that in this the array implementation of WO2009019658, three separate voltage lines must be supplied to each array element, and two switch transistors are required within each array element. A disadvantage of this arrangement is that by having multiple switch elements and bias lines the manufacturing yield may be lower than if fewer devices and connections were used. A further disadvantage is that the physical layout footprint of the array element is also larger than if fewer devices and connections were used.

WO2009019658 further describes the variant pixel circuit 155 shown in FIG. 16, using two diodes 145 and 147 of different sizes. A first switching element transistor 146 connects the first diode 145 to a read line 148, and the second switching element 144 connects the second diode 147 to second column electrode line 150. The gates of the two transistors 144 and 146 are connected to the same row select line RWS. The cathodes of both the first diode 145 and the second diode 147 are coupled to ground GRD. The same current is passed through each diode 145,147 and the voltage difference between the anodes is proportional to temperature and can be measured by means of the arrangement already described.

Other arrangements for array based temperature sensing are also known. For example U.S. Pat. No. 6,633,656 (F. Picard; issued Oct. 14, 2003) describes an array of thermistors for fingerprint sensing. A temperature sensor array may be used for the detection or recognition of fingerprints according to the well-known means described. When a finger is placed in thermal contact with the temperature sensor array, individual elements within the array may register different temperature changes in accordance with whether they are in local proximity to a ridge or a valley of the fingertip structure. Thus by scanning multiple elements in an array thermal means can be used to register and image of the fingerprint.

WO2009019658 further describes array based circuitry for supplying a current to a heating element. The basic circuit element 504 is shown in FIG. 17. A switch element transistor 514 is addressed by means of a write line 510 and a row select line 512 connected at A1. When the switch is turned on by means of the row select line at A1, a voltage is programmed across capacitor 516. Depending on the value of the programmed voltage the transistor 508 may be turned on to some extent. This in turn results in a current flowing from VCC 506 to a ground line 502 through transistor 508 and a resistive heating element 518.

SUMMARY OF INVENTION

A basic aspect of the invention is an arrangement for an array-based temperature sensor. The array elements may each be realised using a sensor element, one row select switch transistor, one row select line, and one column electrode. The row select switch transistor is connected in parallel with the sensor element and each of the sensor elements within the same column of the array are connected in series.

The advantage of the array element circuit of this invention compared to those described in prior art WO2009019658, for example, is that it can be realised with one fewer switch transistor and one fewer column electrode connection per array element.

The advantages of this simplification in circuit topology are:
  The circuit may be realised with a smaller layout footprint.
    The array elements may therefore be made smaller increasing the resolution of the temperature sensor array.
  Reducing the number of connections and circuit elements is advantageous for improving manufacturing yield and hence in reducing cost.

According to an aspect of the invention, an array element for a temperature sensor array circuit is provided. The array element includes a switch transistor; and a temperature sensor element having an impedance which varies as a function of temperature, the temperature sensor element being connected in parallel with a source and drain of the switch transistor.

According to another aspect, the temperature sensor element includes at least one diode.

In accordance with another aspect, the temperature sensor element includes a plurality of diodes connected in series.

According to yet another aspect, the array element further includes a second temperature sensor element having an impedance which varies as a function of temperature and a second switch transistor connected in series, the series-connected second temperature sensor element and second switch transistor being connected in parallel with the source and drain of the switch transistor.

According to still another aspect, the array element is in combination with an output circuit, wherein when the switch transistor is turned off the output circuit is configured to sink a bias current through the temperature sensor element and measure a resultant voltage, and when the switch transistor is turned on the bias current is short circuited around the temperature sensor element.

In accordance with another aspect, a temperature sensor array circuit is provided which includes an M×N array of array elements arranged in M rows and N columns. Each array element includes a switch transistor; and a temperature sensor element having an impedance which varies as a function of temperature, the temperature sensor element being connected in parallel with a source and drain of the switch transistor, wherein with respect to the array elements in each column, the temperature sensor elements are connected in series with the temperature sensor element belonging to the array element in the first row being connected to a column output circuit included in the temperature sensor array circuit, and the temperature sensor element belonging to the array element in the M th row being connected to a power supply voltage, and as for the array elements in each row, the gates of the switch transistors are connected to a same row select signal line.

According to another aspect, the temperature sensor array circuit includes a row driver for selectively providing a corresponding row select signal to each of the row select signal lines, wherein to measure a temperature obtained by a given array element in a given row: the row driver is configured to provide a row select signal on the row select signal line of the given row to turn off the switch transistor included in each of the array elements in the given row, and to cause the switch transistors in the array elements in the rows other than the given row to turn on; and the column output circuit connected to the array element included within the first row of the same column as the given array element is configured to sink a bias current through the given temperature sensor element and measure a resultant voltage.

According to another aspect, the column output circuit includes different column output circuits for different columns in the M×N array.

According to yet another aspect, the column output circuit includes a same column output circuit shared among different columns in the M×N array.

In accordance with another aspect, the temperature sensor element in each of the array elements includes at least one diode.

According to still another aspect, the temperature sensor element in each of the array elements includes a plurality of diodes connected in series.

According to another aspect, each array element further includes a second temperature sensor element having an impedance which varies as a function of temperature and a second switch transistor connected in series, the series-connected second temperature sensor element and second switch transistor being connected in parallel with the source and drain of the switch transistor.

In accordance with another aspect of the invention, an active matrix electrowetting-on-dielectric (AM-EWOD) device is provided which includes an active matrix array for manipulating droplets thereon; and a temperature sensor array circuit as described herein, the temperature sensor array circuit being configured to measure temperatures on the active matrix array.

According to still another aspect, the active matrix array control electronics and the temperature sensor array circuit electronics are disposed on a same substrate.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 1 shows prior art: an arrangement for implementing electrowetting-on-dielectric;

FIG. 2 shows prior art: an improved arrangement for implementing electrowetting-on-dielectric using top and bottom substrates;

FIG. 3 shows prior art: a passive matrix EWOD device;

FIG. 4 shows prior art: lateral droplet movement in an EWOD device;

FIG. 5 shows prior art: the standard display pixel circuit;

FIG. 6 shows prior art: an active matrix EWOD device;

FIG. 7 shows prior art: an example AM-EWOD driver circuit arrangement;

FIG. 8 shows prior art: an arrangement for heating a quantity of liquid with temperature measurement for feedback control;

FIG. 9 shows prior art: the circuit symbol of a diode showing the anode and cathode connections;

FIG. 10 shows prior art: a possible architecture of a diode device fabricated in a thin film process;

FIG. 11 shows prior art: a circuit arrangement for measuring temperature using a diode as a temperature sensor element;

FIG. 12 shows prior art: a switched capacitor arrangement for realising a circuit element whose performance approximates to a large value resistor;

FIG. 13 shows prior art: a circuit arrangement for measuring temperature using a diode as a temperature sensor element and employing a calibration means;

FIG. 14 shows prior art: a pixel circuit for array based temperature sensing;

FIG. 15 shows prior art: a circuit arrangement for a temperature sensor array;

FIG. 16 shows prior art: a further circuit arrangement for a temperature sensor array;

FIG. 17 shows prior art: an array element circuit for a heater;

DETAILED DESCRIPTION OF INVENTION

Figure 18:
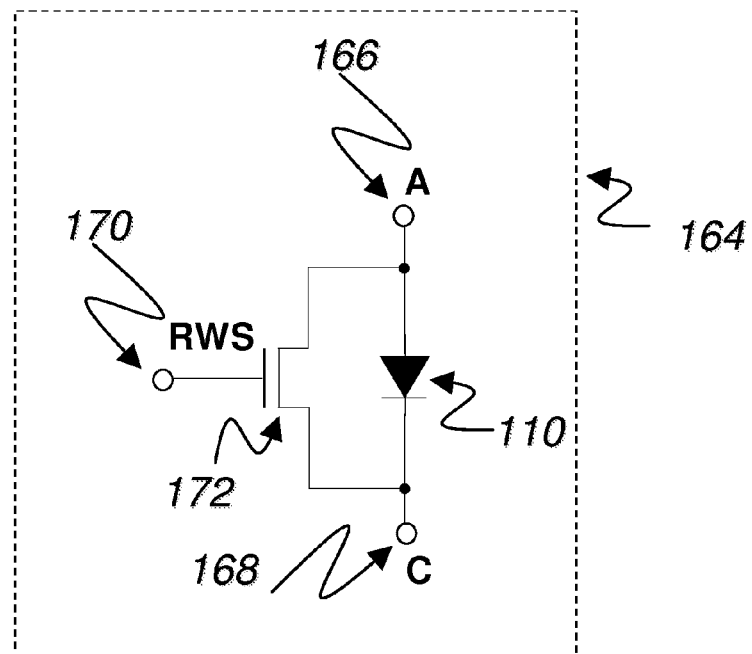
FIG. 18 shows the array element circuit of the first embodiment of the invention.

The first embodiment of the invention is shown in FIG. 18. This embodiment is a circuit for an array element 164 for a temperature sensor array circuit. The array element 164 includes a switch transistor 172 and a temperature sensor element 110 which may be a diode, as is shown. In an alternative embodiment, it will be appreciated by those having ordinary skill in the art that the temperature sensor element 110 may be any other type of known temperature sensor element without departing from the scope of the invention.

The array element 164 is connected as follows: the temperature sensor element 110 is connected between the drain of the switch transistor 172 and the source of the same transistor 172. The gate of the switch transistor 172 is connected to a row select line RWS at 170 common to each array element in the same row of the array. The array element has three connections denoted RWS, A and C corresponding to the row select line, the anode of the temperature sensor element 110 and the cathode of the temperature sensor element 110, respectively.

Figure 19:
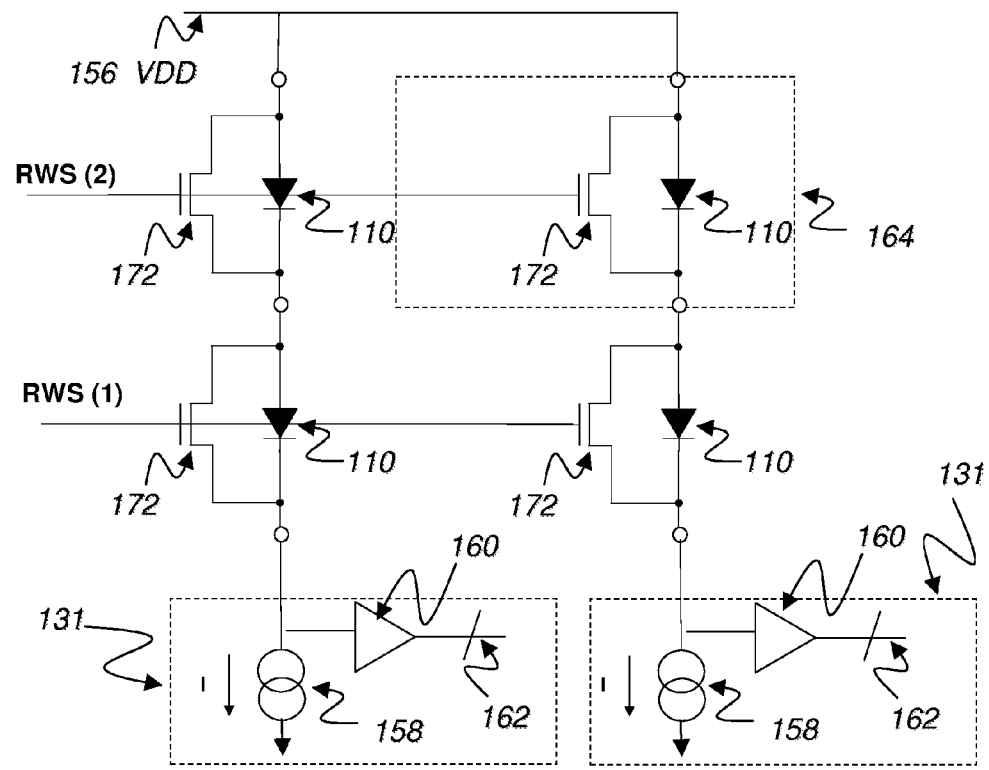
FIG. 19 shows an example implementation of the first embodiment.

Multiple array elements 164 are connected together to form a temperature sensor array circuit as shown in FIG. 19. In this particular example the temperature sensor array circuit is a 2×2 array, but those having ordinary skill in the art will appreciate that the array could be virtually any size array. The anode connection of each of the temperature sensor elements 110 of the second row of the array (the uppermost row in FIG. 19) is connected to a rail for the power supply voltage VDD 156. The cathode connection of each of the temperature sensor elements 110 in the second row is connected to the anode connection of the corresponding temperature sensor element 110 within the same column of the adjacent first row (the lowermost row in FIG. 19). The cathode connection of the temperature sensor element 110 in the first row is connected to the input of the column output circuit 131. The column output circuit 131 may be constructed by standard means, for example as described in the prior art section. In this embodiment a separate column output circuit 131 is provided for each column of the array.

The operation of the temperature sensor array circuit is as follows:

For the array elements in a given row whose respective temperatures are to be measured, the RWS signal for that row is taken low so that the switch transistors 172 of all the array elements in this row are turned off, thereby selecting the row and the temperature sensor elements 110 therein. For all the other row elements in the array the RWS signal is maintained at a high level so that the switch transistors 172 in all the array elements in these other rows are turned on, resulting in these rows and the temperature sensor elements 110 therein not being selected. In the case of the rows not selected, the switch transistors 172 act so as to short circuit their corresponding temperature sensor elements 110 in these rows. Therefore, in effect, the anode of the temperature sensor element 110 of the row selected is connected to the rail for the power supply voltage VDD 156, and the cathode of the temperature sensor element 110 in the row selected is connected to the input of the column output circuit 131. The circuit then operates as has already been described in prior art. The column output circuit 131 of each column acts to sink a bias current through the temperature sensor element 110 in that column of the selected row, and measures the voltage at the cathode of the temperature sensor element 110 thus selected. In the case where the temperature sensor element 110 is a diode as shown, the sign of the current may be chosen so that the diode is in forward bias. This voltage is equal to the power supply voltage VDD minus the potential difference between the connections A and C of the temperature sensor element 110. This quantity is temperature dependent as has already been described above with respect to the prior art. By sampling the output 162 of a given column amplifier 160, a quantity representing the temperature of the temperature sensor element 110 in the location of the row selected and the sampled column is measured.

It will be readily appreciated by one skilled in the art that this architecture can easily be generated to an arbitrary M×N size array. In this case, the cathode of the sensor elements 110 in the first row are connected to the column output circuit 131 of that column, the anode of the sensor elements 110 in the M th row are connected to the power supply voltage VDD, and the anodes of the temperature sensor elements 110 in the k th row are connected to the cathodes of the sensor elements in the k+1 th row of the same column, for all values of k between 1 and M−1. As a result, the temperature sensor elements 110 in each column are connected in series. The operation of the temperature sensor array circuit is then essentially identical to the case of the 2×2 array described.

It is important for the successful operation of the temperature sensor array circuit that the bias current I sunk by the column output circuit 131 is chosen correctly. The bias current I should be chosen to be sufficiently small such that the following criteria are met:

- The bias drop across the series combination of the M−1 switch transistors 172 in rows not selected is small in comparison with the bias drop across the temperature sensor element 110 in the row that is selected. This criterion should be adhered to within all of the desired temperature range.
- The input voltage of the amplifier circuit 160 of the column output circuit 131 should remain within its design operating range for all temperatures within the range which it is required to sense the temperature.
- Self heating of the temperature sensor element 110 due to its own resistance should be minimal.

Additionally the bias current I should be chosen to be sufficiently large such that the following criteria are also met:

- The value of VDD required is not too large and does not exceed the range of typical power supply biases for the processing technology used to fabricate the circuit. (In general the larger the value of bias current I, the higher the power supply voltage VDD is required to be)
- The input voltage of the amplifier circuit 160 of the column output circuit 131 should remain within its design operating range for all temperatures within the range which it is required to sense the temperature.
- The bias current I through the temperature sensor element 110 in a row which is selected is well in excess of any reverse leakage current through the temperature sensor elements 110 in the rows which are not selected.

The optimised value of the bias current I to be used in a practical design will depend on the temperature range across which the temperature sensor array is desired to operate, the size of the array, the process technology used to fabricate the array. In general it is advantageous for values of the bias current I to be relatively small (typically within the range pico-amps to micro-amps, depending on the process technology used to fabricate the sensor array).

Advantages of operating with a value of bias current I chosen to meet the above criteria are typically as follows:

- If the temperature sensor element 110 is a thin film diode as described in prior art, its operation may be in the range where sensitivity to temperature is maximum and linear. For this to be the case, the value of the bias current I should be sufficiently small such that the bias drop across the temperature sensor element 110 is predominantly that due to the behaviour of the p-n junction, and that voltage drop due to the self resistance of the diode is small in comparison
- The circuit power dissipation due to resistive losses in array element components is minimal.
- There is minimal self-heating due to power dissipation in the temperature sensor element 110. Self-heating is to be avoided since the act of measuring the temperature should preferably not itself influence the temperature.
- The circuit may be designed to give a linear output characteristic over a wide range of temperature values.
- The optimised value of VDD is typically not required to be large or outside of the typical range of bias voltages used in the process technology used to fabricate the circuit.

Suitable techniques for realising column output circuits 131 well suited to this mode of operation and as may be employed in this embodiment have been described in the prior art section.

The advantages of this embodiment are:

- The temperature sensor array circuit may be realised with a smaller layout footprint than the temperature sensor array circuits described in prior art. The array elements may be made smaller, increasing the resolution of the temperature sensor array circuit.
- Reducing the number of connections and circuit elements is advantageous for improving manufacturing yield and hence in reducing cost.

It will be apparent to one skilled in the art that the switch transistor 172 within the array elements may be realised by any one of a number of transistor technologies, e.g. MOS, TFT, bipolar, etc. in accordance with the manufacturing process employed, and may be either an n- or p-type device.

Figure 20:
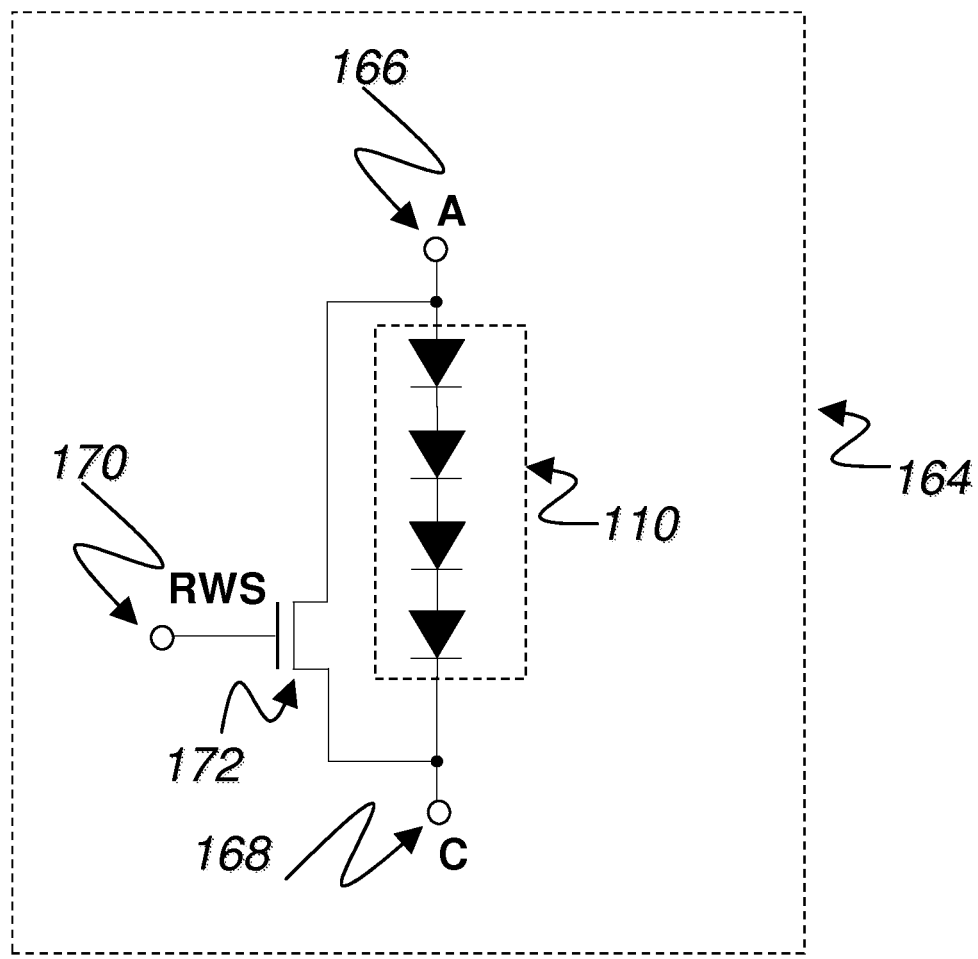
FIG. 20 shows the array element circuit of the second embodiment of the invention.

A second embodiment of an array element in accordance with the invention is shown in FIG. 20. This embodiment is as the first embodiment where the temperature sensor element 110 comprises a multiplicity of diodes connected in series, as described in prior art. The operation of this embodiment is then the same as described for the first embodiment.

An advantage of this second embodiment is that the use of multiple diodes increases the sensitivity of the array element circuit by increasing the change in the output voltage for a given change in temperature. This may increase the precision of the temperature measurement.

Figure 21:
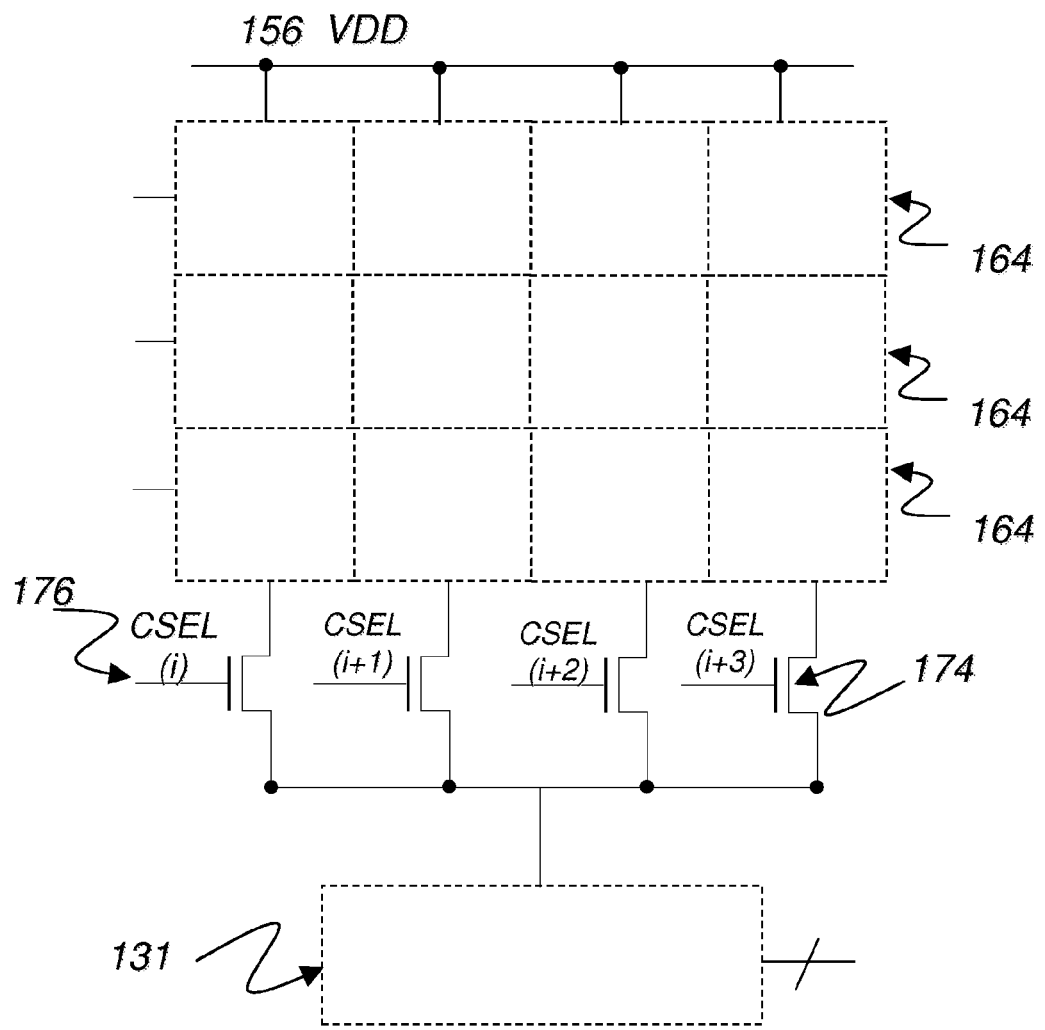
FIG. 21 shows an example implementation of the third embodiment of the invention whereby column output circuits may be shared between multiple columns.

A third embodiment of the invention is shown in FIG. 21. In this embodiment the column output circuit 131 is shared between multiple columns in the temperature sensor array circuit. FIG. 21 shows the case of a 3×4 array where each of the four columns in the array shares a single column output circuit 131 by means of the use of additional column select transistors 174.

The temperature sensor array circuit is connected as follows: the array element circuit is arranged and connected similar to that described in the first embodiment (FIG. 19). The cathode connection of the first row array element in each column is connected to a column select transistor 174. The gate of each column select transistor 174 is connected to a column select line 176. The sources of the column select transistors 176 in each column are connected together and are connected to the input of the column output circuit 131.

The operation of the temperature sensor array circuit of the third embodiment is similar to that described for the first embodiment. An array element is selected by applying logic high signals to the row select line RWS and the column select CSEL appropriate to the location of the array element. The addition of the column select switch transistors means that several columns in the array may share the same column output circuit 131, with the column element selected being switched into the circuit by the appropriate column select transistor 174.

An advantage of this embodiment is that by sharing column output circuits 131 the total number of components may be further reduced. This has the benefit of reducing the bezel size and improving manufacturing yield. A further advantage is that power consumption by the column output circuits 131 is reduced. It will be appreciated that in another embodiment of the invention, the temperature sensor array circuit includes multiple column output circuits 131, and each of the column output circuits 131 is shared by multiple columns within the array. Thus, again fewer column output circuits 131 than columns within the temperature sensor array circuit are necessary.

The fourth embodiment is as any of the previous embodiments where the column output circuit is made up of the arrangement 141 shown in FIG. 13 and described in prior art. The column output circuit 141 is configured to make two measurements of the voltage developed at the input of the column output circuit 141 and subtract the results. This is done by configuring the column output circuit 141 for the first measurement to measure the voltage at its input in the case where a bias current $I_1$ is sunk through the temperature sensor elements 110. For the second measurement the column output circuit 141 is configured to sink a different value of bias current $I_2$ and to measure the voltage in this case. By subtracting the two measured voltages a measurement of the temperature is made which is independent of certain process dependent parameters as previously described in the prior art section and shown in equation (7).

An advantage of this embodiment is that by removing dependency on process dependent parameters, a more accurate measurement of the absolute temperature may be achieved.

Figure 22:
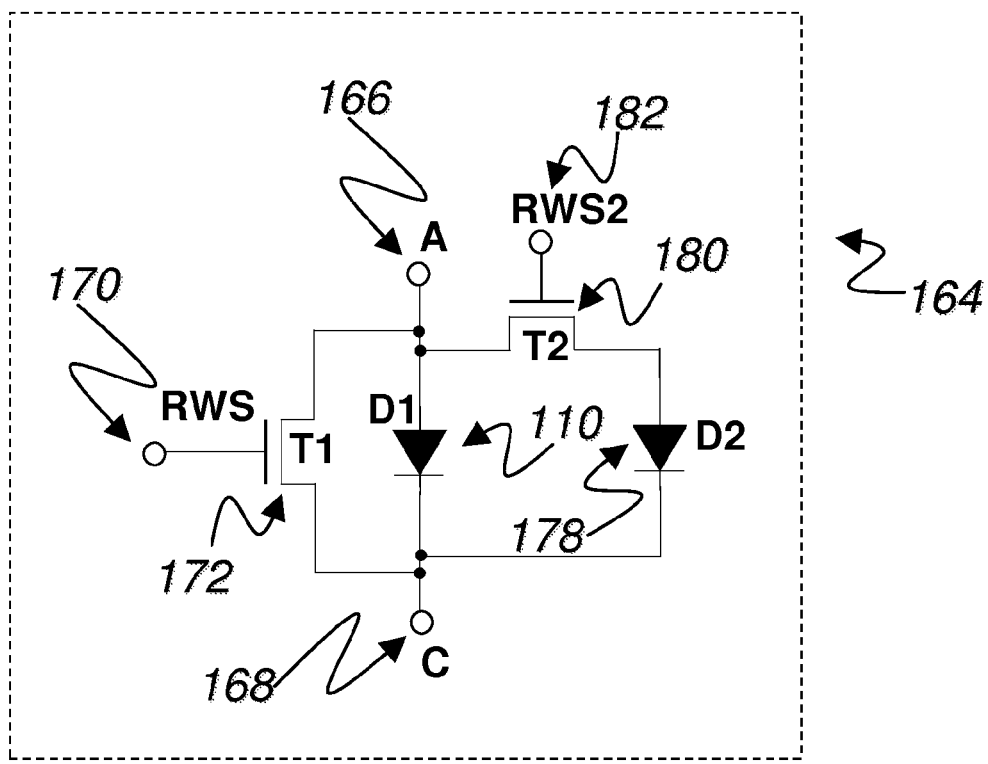
FIG. 22 shows the fifth embodiment of the invention.

A fifth embodiment is as any of the previous embodiments where the circuit is comprised of the arrangement shown in FIG. 22. According to this embodiment a variant array element circuit is implemented.

The array element is connected as follows. The anode of temperature sensor element 110 is connected to the anode terminal 166 of the array element, the drain of the switch transistor 172 and the drain of a switch transistor 180. The cathode of the temperature sensor element 110 is connected to the cathode terminal 168 of the array element, the source of the switch transistor 172 and the cathode of the temperature sensor element 178. The source of a switch transistor 180 is connected to the anode of the temperature sensor element 178. A first row select line RWS at 170 is connected to the gate of the switch transistor 172. A second row select line RWS2 at 182 is connected to the gate of the switch transistor 180.

The operation of a temperature sensor array circuit incorporating array elements of the type shown in FIG. 22 is similar to that described for the fourth embodiment. The circuit may be configured to sink a bias current I between the anode 166 and cathode 168 terminals of the array elements similar to as previously described. Two separate measurements of the voltage generated at the input of the column output circuit 141 are then performed. More specifically, in the first measurement the switch transistor 172 of the array element row selected is turned off and the switch element 180 is turned off. In this case the measured voltage is equal to that dropped across temperature sensor element 110. In the second measurement the switch transistor 172 is turned off and the switch transistor 180 is turned on. In this case the temperature sensor elements 110 and 178 are connected in parallel and a different output voltage is measured.

The situation is analogous to that described in the prior art section whereby the width of the temperature sensor element is different for the two measurements. By subtracting the two measured voltages a quantity representative of the absolute temperature is obtained. In accordance with equation 10 and the arguments presented in prior art this measured quantity is independent of certain process dependent parameters. An advantage of this embodiment is that by removing dependency on process dependent parameters, a more accurate measurement of the absolute temperature may be obtained.

When the array element in accordance with this embodiment is not selected, switch transistor 172 is turned on so as to short circuit both temperature sensor elements 110 and 178. Switch transistor 180 may be turned on or off as will be appreciated.

For optimal implementations of this embodiment the temperature sensor elements 110 and 178 should be designed to have similar electrical characteristics such that the substantially same current per unit width will pass through each device.

It will be apparent to one skilled in the art that any of the above-described embodiments could be implemented in an AM-EWOD device as described in the prior art, with the AM-EWOD control electronics and temperature sensor array electronics disposed upon the same substrate. For example, an AM-EWOD device in accordance with the present invention utilizes a temperature sensor array circuit with corresponding array elements as described above with respect to FIGS. 18-22. The basic structure of the AM-EWOD device is that which is described above in relation to FIGS. 7 and 8, for example. In accordance with the present invention, however, the temperature sensor elements 90 and temperature measurement circuit 98 are replaced in relevant part with the array of temperature sensor elements 110, switch transistors 172, column output circuits 131, etc. The integrated row driver 76 and column driver 78 are configured to provide the corresponding row select line RWS signals at the desired timings for measuring the temperature at each pixel of the AM-EWOD and providing the desired function, e.g. temperature feedback, etc. The whole device can therefore function as a standard AM-EWOD with the additional functionality of in-built array-based temperature sensor capability. The inclusion of the temperature sensor capability may facilitate the device to perform some or all of the following functions:

- Measure the temperature of individual droplets within the AM-EWOD array
- Detect the presence of endothermic or exothermic chemical reactions occurring between droplets
- Control the temperature of individual droplets within the array
- Control the operation of heater elements by the implementation of feedback, using for example, techniques described in the prior art section.
- Perform an assay which requires, or is assisted by, the use of thermal control It will further be apparent to skilled in the art that that the temperature sensor array of any of the described embodiments may be implemented in a system containing heater elements, as for example described in prior art. The temperature sensor array may be used in a feedback system to control the temperature at one or more spatial locations within the system.

It will further be apparent to one skilled in the art that embodiment the temperature sensor array described in any of the described embodiments may form part of a system for performing DNA multiplication by PCR. By incorporating the temperature sensor array of this invention into a PCR system, the temperature of fluid reagents undergoing PCR may be accurately controlled. An advantage of array-based temperature sensing is that the temperature may be monitored at multiple spatial locations. This facilitates temperature control local to certain areas of the system. This is advantageous in a PCR system where thermal cycling is required and for reasons of increased efficiency, reaction time, throughput etc. it may be useful to maintain different regions of the system at different temperatures.

It will further be apparent to one skilled in the art that that the temperature sensor array of any of the described embodiments could be implemented in a system for detecting one or more chemical or biochemical reactions occurring at any spatial location within the system.

It will further be apparent to one skilled in the art that that the temperature sensor array of any of the described embodiments could be implemented in a system for scanning, measuring or detecting fingerprint images using standard techniques as described in prior art.

It will be further apparent that, as noted above, the temperature sensor element 110 may be another type of known temperature sensor element without departing from the scope of the invention. For example, the invention is described primarily in the context of the temperature sensor element comprising at least one diode which has a resistance that varies as a function of temperature. More generally, however, the temperature sensor element may be any type of known temperature sensor element having an impedance which varies as a function of temperature.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The temperature sensor array circuit of the present invention offers a simplified circuit topology realizable with a smaller layout footprint. The array elements may therefore be made smaller increasing the resolution of the temperature sensor array. The invention provides the advantages of improving manufacturing yield and hence in reducing cost.

The invention claimed is:

1. An array element for a temperature sensor array circuit, comprising:
   a switch transistor;
   a temperature sensor element having an impedance which varies as a function of temperature, the temperature sensor element being connected in parallel with a source and drain of the switch transistor; and
   a second temperature sensor element having an impedance which varies as a function of temperature and a second switch transistor connected in series with the second temperature sensor element, the second temperature sensor element and second switch transistor which are connected in series being connected in parallel with the source and drain of the switch transistor.

2. An array element for a temperature sensor array circuit in combination with an output circuit, the array element comprising a switch transistor; and a temperature sensor element having an impedance which varies as a function of temperature, the temperature sensor element being connected in parallel with a source and drain of the switch transistor, and
   wherein when the switch transistor is turned off the output circuit is configured to sink a bias current through the temperature sensor element and measure a resultant voltage, and when the switch transistor is turned on the bias current is short circuited around the temperature sensor element.

3. A temperature sensor array circuit, comprising:
   an M×N array of array elements arranged in M rows and N columns, each array element comprising:
      a switch transistor; and
      a temperature sensor element having an impedance which varies as a function of temperature, the temperature sensor element being connected in parallel with a source and drain of the switch transistor,
   wherein with respect to the array elements in each column, the temperature sensor elements are connected in series with the temperature sensor element belonging to the array element in the first row being connected to a column output circuit included in the temperature sensor array circuit, and the temperature sensor element belonging to the array element in the M th row being connected to a power supply voltage, and
   as for the array elements in each row, the gates of the switch transistors are connected to a same row select signal line.

4. The temperature sensor array circuit according to claim 3, comprising a row driver for selectively providing a corresponding row select signal to each of the row select signal lines,
   wherein to measure a temperature obtained by a given array element in a given row:
      the row driver is configured to provide a row select signal on the row select signal line of the given row to turn off the switch transistor included in each of the array elements in the given row, and to cause the switch transistors in the array elements in the rows other than the given row to turn on; and
      the column output circuit connected to the array element included within the first row of the same column as the given array element is configured to sink a bias current through the given temperature sensor element and measure a resultant voltage.

5. The temperature sensor array circuit according to claim 3, wherein the column output circuit comprises different column output circuits for different columns in the M×N array.

6. The temperature sensor array circuit according to claim 3, wherein the column output circuit comprises a same column output circuit shared among different columns in the M×N array.

7. The temperature sensor array circuit according to claim 3, wherein the temperature sensor element in each of the array elements comprises at least one diode.

8. The temperature sensor array circuit according to claim 3, wherein the temperature sensor element in each of the array elements comprises a plurality of diodes connected in series.

9. The temperature sensor array circuit according to claim 3, wherein each array element further comprises a second temperature sensor element having an impedance which varies as a function of temperature and a second switch transistor connected in series with the second temperature sensor element, the second temperature sensor element and second switch transistor which are connected in series being connected in parallel with the source and drain of the switch transistor.

10. An active matrix electrowetting-on-dielectric (AM-EWOD) device comprising:
   an active matrix array for manipulating droplets thereon; and a temperature sensor array circuit as recited in claim 3, the temperature sensor array circuit being configured to measure temperatures on the active matrix array.

11. The AM-EWOD device according to claim 10, wherein active matrix array control electronics for controlling the active matrix array and the temperature sensor array circuit electronics are disposed on a same substrate.

* * * * *